(12) United States Patent
Case et al.

(10) Patent No.: US 7,588,287 B2
(45) Date of Patent: Sep. 15, 2009

(54) SEAT SECURING APPARATUS

(75) Inventors: Michael David Case, Kechi, KS (US); Kyle Brenner, Silvis, IL (US); Loras Lavern Weinschenk, Camanche, IA (US)

(73) Assignee: CNH America LLC, New Holland, PA (US)

( * ) Notice: Subject to any disclaimer, the term of this patent is extended or adjusted under 35 U.S.C. 154(b) by 49 days.

(21) Appl. No.: 12/023,382

(22) Filed: Jan. 31, 2008

(65) Prior Publication Data

US 2009/0195023 A1 Aug. 6, 2009

(51) Int. Cl.
*B60J 7/00* (2006.01)
(52) U.S. Cl. .......................... 296/190.08; 296/190.05; 180/89.15
(58) Field of Classification Search ............ 296/190.08, 296/187.01, 203.01, 190.01, 190.03, 63, 296/190.04, 68.01, 190.05; 180/89.13, 89.12, 180/89.17, 89.15
See application file for complete search history.

(56) References Cited

U.S. PATENT DOCUMENTS

| | | | |
|---|---|---|---|
| 3,051,259 A * | 8/1962 | Otto Lorenz ............. | 180/89.14 |
| 3,126,975 A * | 3/1964 | Dafoe ..................... | 180/89.15 |
| 3,765,500 A * | 10/1973 | Reeves ..................... | 180/89.15 |
| 3,874,539 A * | 4/1975 | Staley ........................ | 296/66 |
| 4,076,302 A | 2/1978 | Sable | |
| 4,362,220 A | 12/1982 | Baston | |
| 4,408,672 A | 10/1983 | Albright et al. | |
| 4,813,736 A * | 3/1989 | Schubert et al. ........ | 296/190.05 |
| 5,042,602 A * | 8/1991 | Nakatani et al. ......... | 180/89.14 |
| 5,551,826 A * | 9/1996 | Todd et al. ............. | 296/190.07 |
| 5,671,820 A | 9/1997 | Kobayashi et al. | |
| 5,941,330 A | 8/1999 | Miller et al. | |
| 5,971,434 A | 10/1999 | Neufeld et al. | |
| 6,189,955 B1 | 2/2001 | Fryk et al. | |
| 6,357,820 B1 | 3/2002 | Nagatsuka et al. | |
| 6,371,232 B1 | 4/2002 | Drake et al. | |
| 6,543,563 B1 | 4/2003 | Muraro | |
| 6,854,546 B2 * | 2/2005 | Beckstrom ............... | 180/89.13 |
| 6,910,731 B2 * | 6/2005 | Albright et al. ........ | 296/190.06 |
| 2004/0119320 A1 * | 6/2004 | Albright et al. ........ | 296/190.05 |
| 2005/0264038 A1 * | 12/2005 | Albright ................ | 296/190.05 |
| 2006/0266573 A1 | 11/2006 | Ishii et al. | |
| 2007/0046070 A1 * | 3/2007 | Hayes et al. ........... | 296/190.08 |
| 2007/0145780 A1 | 6/2007 | Tecklenburg et al. | |
| 2007/0145781 A1 * | 6/2007 | Haboon et al. ......... | 296/190.09 |

* cited by examiner

*Primary Examiner*—Kiran B. Patel
(74) *Attorney, Agent, or Firm*—Michael G. Harms; John William Stader; Patrick M. Sheldrake (57) ABSTRACT

A work vehicle includes a frame, and a cab structure and a seat each pivotably connected to the frame. In response to the cab structure and seat being disposed in an operating position with the frame, the cab structure substantially prevents pivotable movement of the seat.

7 Claims, 7 Drawing Sheets

SEAT SECURING APPARATUS

FIELD OF THE INVENTION

The present invention relates generally to the field of work vehicles. It relates more particularly to securing a seat of a work vehicle.

BACKGROUND OF THE INVENTION

Work vehicles, such as skid steer loaders, have longitudinally spaced pairs of wheels rotatably carried by a frame or chassis of the loader to permit a driving rotation thereof. Each of the wheels is driven, usually by hydraulic motors powered from an engine supported by the frame of the loader. Steering of the skid steer loader is accomplished by powering the rotation of the wheels on opposing sides of the frame of the loader at differential speeds.

Typically, the hydraulic motors and associated linkages are located beneath the seat of the skid steer loader. To service the apparatus beneath the seat, it is necessary to remove the seat from the loader, which is usually accomplished by unbolting the seat from the frame and physically relocating the seat out of the relatively small operator's cab area in which the seat is normally located. The removal of the bolts fastening the seat to the loader frame, and the subsequent re-insertion of the bolts to properly replace the seat, requires a significant amount of time, particularly in comparison to the normal time required for minor servicing of these components.

Accordingly, it would be advantageous to provide a means for quickly and easily accessing drive components located beneath the seat of the work vehicle.

SUMMARY OF THE INVENTION

The present invention relates to a work vehicle including a frame, and a cab structure and a seat each pivotably connected to the frame. In response to the cab structure and seat being disposed in an operating position with the frame, the cab structure substantially prevents pivotable movement of the seat.

The present invention further relates to a work vehicle including a frame, and a cab structure and a seat each pivotably connected to the frame. A junction between the cab structure, seat and frame forms a substantially particle tight seal. In response to the cab structure and seat being disposed in an operating position, the cab structure substantially prevents pivotable movement of the seat.

The present invention further relates to a seat and the cab structure configured and disposed to be pivotably connectable to a frame. In response to the cab structure and seat being disposed in an operating position with the frame in which a portion of the cab structure overlies a portion of the seat, the cab structure substantially prevents pivotable movement of the seat.

An advantage of the present invention is a reduction of time associated with accessing components disposed beneath a work vehicle having a cab.

A further advantage of the present invention is enhanced comfort for a work vehicle operator, in that restraint devices mounted to a cab structure do not move independently of a seat, in response to both of the cab structure and seat being disposed in an operating position with a frame of a work vehicle.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
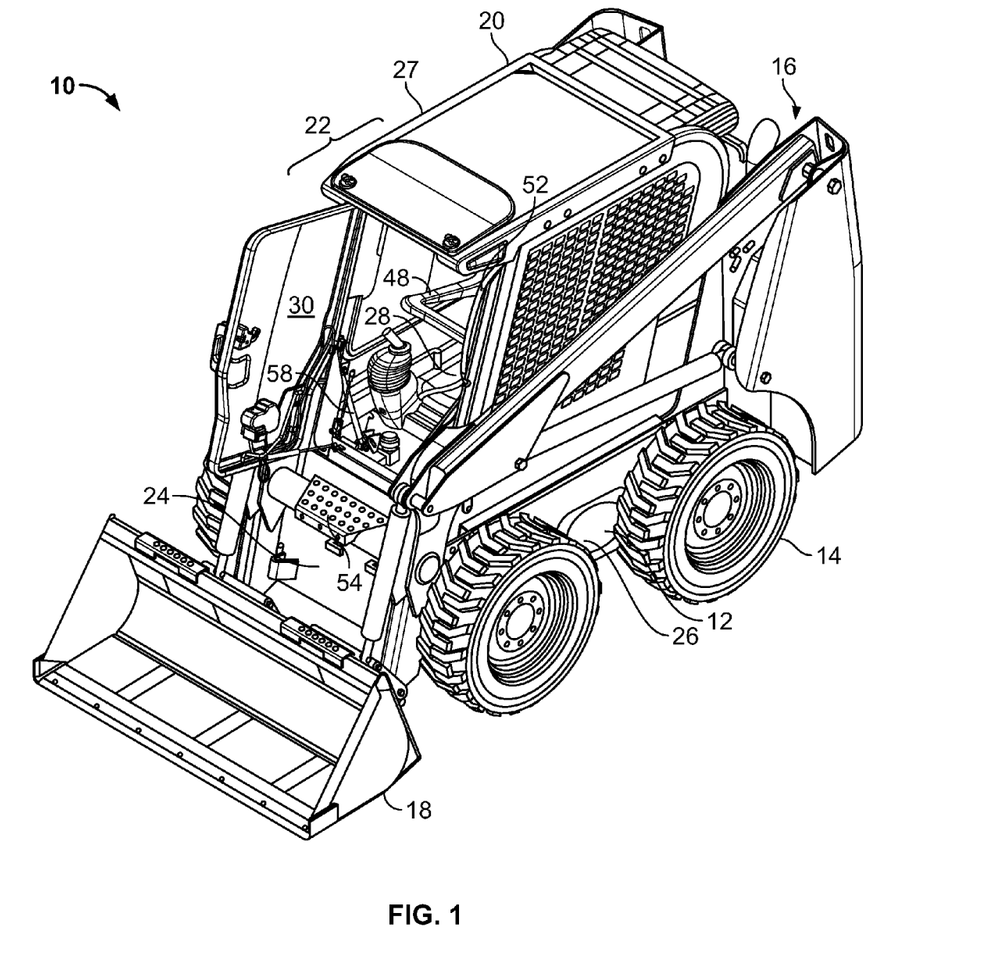
FIG. 1 is a top perspective front view of an embodiment of a work vehicle of the present invention.

FIG. 1 shows an exemplary work vehicle 10 including a frame 12 that rotatably carries a plurality of wheels 14. A lifting structure 16 including an arrangement of structural members and actuators controllable by an operator (not shown) to manipulate an implement 18 to perform work is also connected to the frame 12. Frame 12 structurally supports a cab structure 20 to surround and protect the operator, which frame 12 includes a front end 24 facing implement 18. Front end 24 is disposed between opposed sides 26, 27. As further shown in FIG. 1, cab structure 20 includes a brim 22 protruding toward front end 24, although in an alternate embodiment, brim 22 or additional brims may extend toward opposed sides 26, 27 or toward the end opposite end 24. A seat 28 is disposed interior of cab structure 20 which is accessible via a door 30. Door 30 is pivotably connected to cab structure 20. As will be discussed in further detail below, both seat 28 and cab structure 20 are pivotably connected to frame 12, providing enhanced access to apparatus disposed beneath the seat 28 and cab structure 20. Additionally, in response to the cab structure 20 and seat 28 being disposed in an operating position with the frame 12, the cab structure 20 substantially prevents pivotable movement of the seat 28. The operating position is a position in which an operator may be seated and operate the work vehicle. Stated another way, in the closed or operating position, cab structure 20 and seat 28 are substantially immobile with respect to each other and to frame 12.

Figure 2:
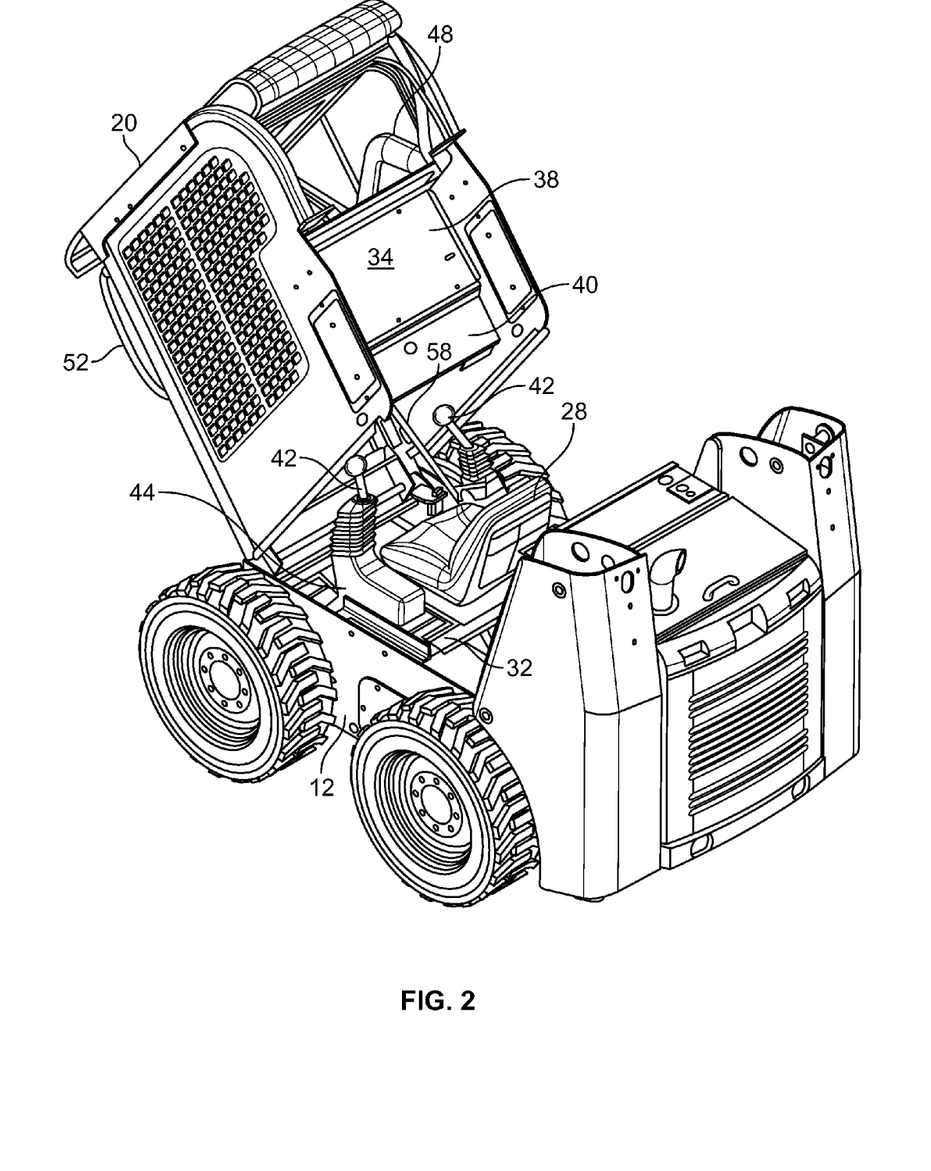
FIG. 2 is a top perspective rear view of an embodiment of a work vehicle, lifting structure removed, of the present invention.

FIG. 2 shows a top perspective rear view of the exemplary work vehicle 10 of FIG. 1 with cab structure 20 rotated or pivoted away from frame 12 and lifting structure 16 removed for clarity. As shown in FIG. 2, seat 28 is disposed between a pair of operator controls 42 that each includes a respective housing 44. As further shown, seat 28 includes a base 32 that is secured to the seat. In an alternate embodiment, base 32 and seat 28 are of unitary construction.

Figure 3:
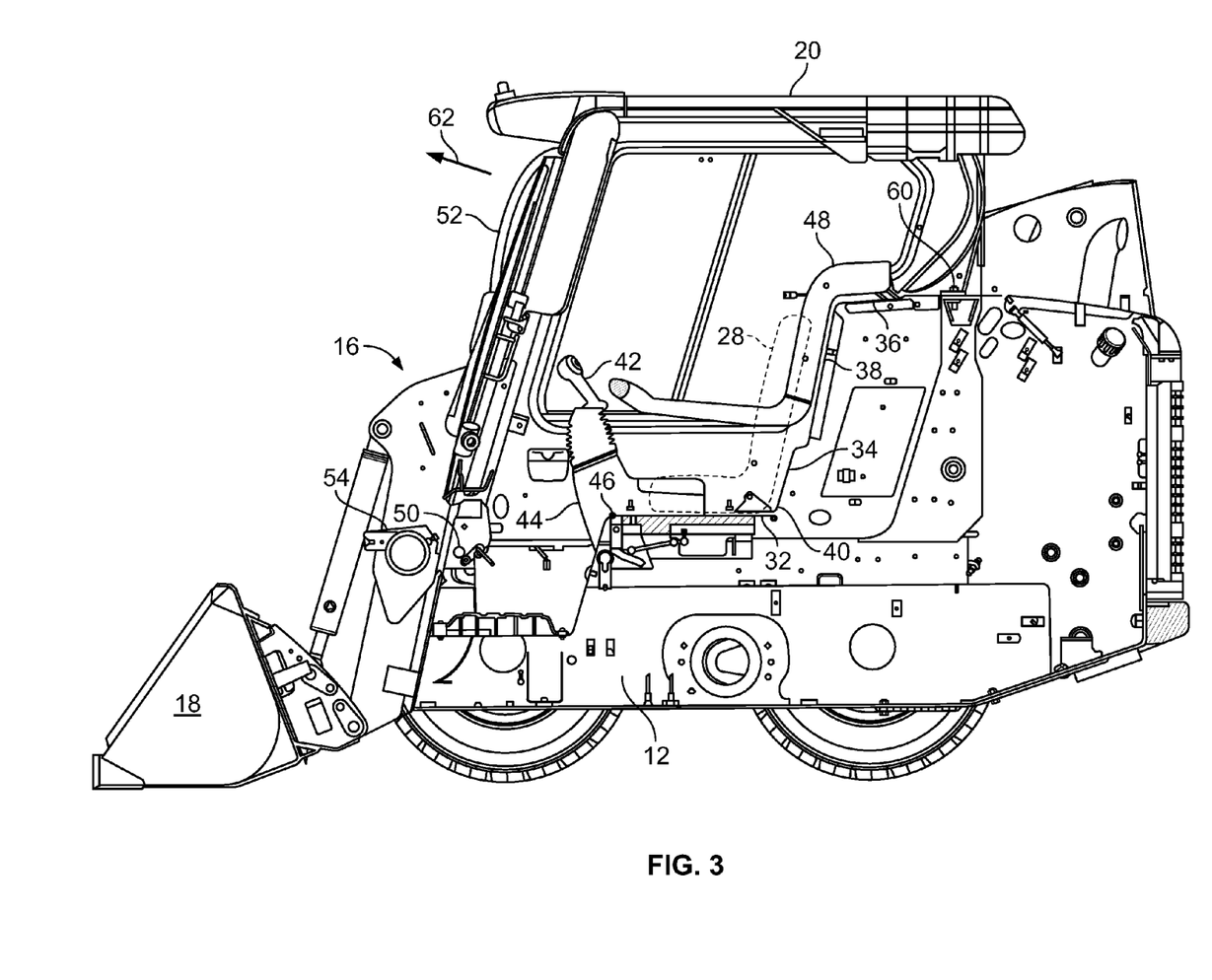
FIG. 3 is a top elevation view of a cutaway of an embodiment of a work vehicle of the present invention.

FIG. 3 shows a partial cutaway view of work vehicle 10 provided for clarity. As shown in FIG. 3, a pivoting connection 46 is disposed between base 32 and frame 12. Pivoting connection 46 may be a hinge, a piano hinge, or other pivoting arrangements.

FIG. 3 further shows components of cab structure 20. For example, cab structure 20 includes a panel 34 that is disposed behind seat 28 when cab structure 20 abuts frame 12, as shown in FIGS. 1 and 3. For purposes herein, abutment of frame 12 with cab structure 20 is referred to as a closed position or operating position of the work vehicle. Panel 34 may include an upper portion 36 extending to a middle portion 38 that further extends to a lower portion 40 which is in close proximity to base 32 supporting seat 28. As shown, at least an amount of lower portion 40 overlies an amount of base 32 of seat 28. In alternate embodiments, panel 34 may be modified or otherwise deleted, so long as a structural component of cab structure 20 substantially prevents pivotable movement of the seat 28 in response to the work vehicle being in the closed position or operating position.

Figure 4:
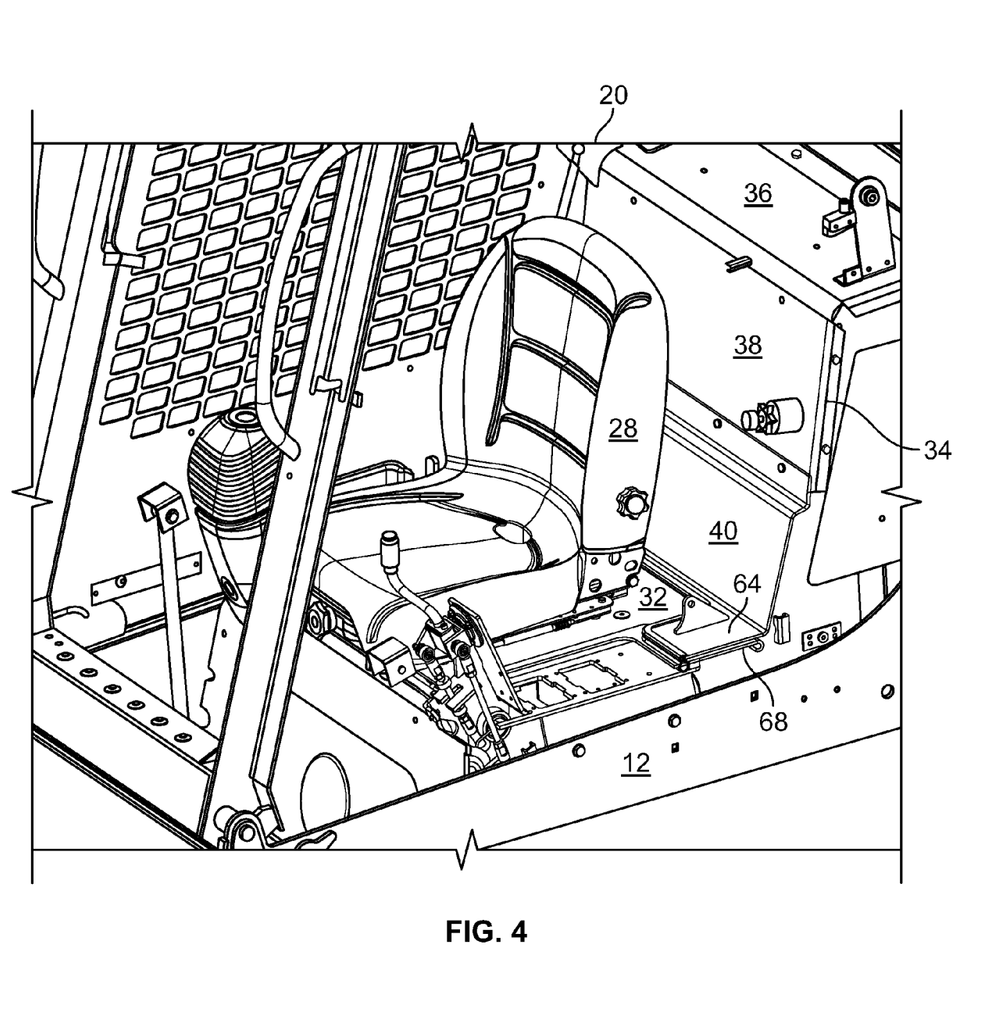
FIG. 4 is an enlarged partial perspective cutaway view looking into an embodiment of a cab structure of the present invention.

As further shown in FIGS. 2 and 3, an operator restraining device 48 is pivotably secured to upper portion 36 of panel 34. However, when cab structure 20 is rotated about pivoting connection 50, panel 34 is raised above seat 28. To effect cab structure 20 rotation, in the exemplary embodiment, fasteners 60 (FIG. 3) securing upper portion 36 to frame 12 are loosened. An operator (not shown) may then place his feet on a step 54 (FIGS. 1 and 3) disposed on lifting structure 16 and grasp hand rail 52 disposed along a vertical corner of cab structure 20 and apply an opening force 62 (FIG. 3). A strut 58 (FIGS. 1 and 2) extends, providing an opening force along its length to help move cab structure 20 from the closed or operating position, as shown in FIG. 1, to an open position that is shown in FIGS. 2 and 4. It is appreciated that other constructions may be used to achieve an open cab structure 20 position with respect to frame 12. In the exemplary embodiment, the open position represents a rotation of cab structure 20 between about 55 to about 60 degrees with respect to the frame 12, shown in FIGS. 2 and 4, as compared to the closed position depicted in FIGS. 1 and 3.

Figure 5:
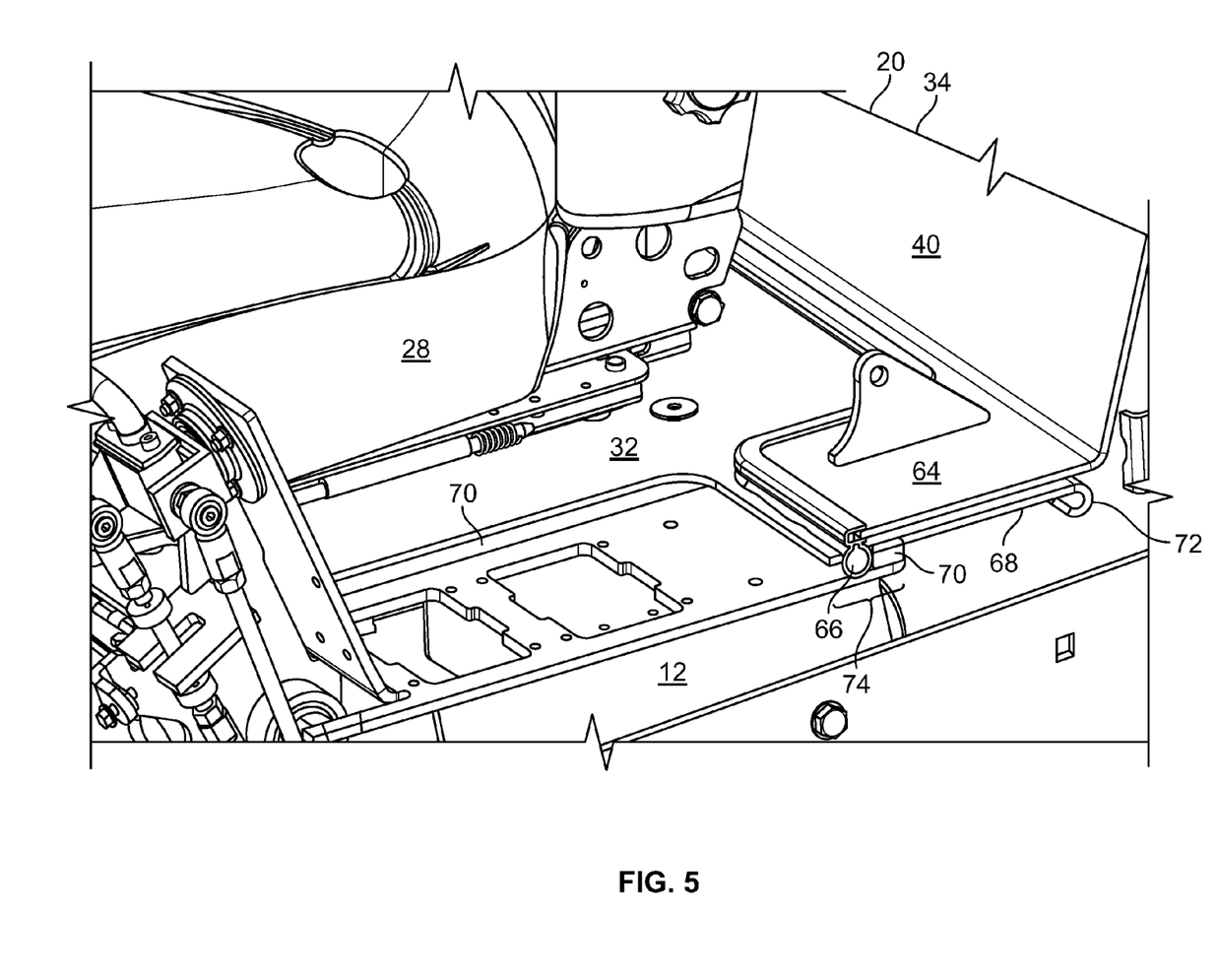
FIGS. 5 and 6 are further enlarged partial perspective cutaway views from FIG. 4.
Figure 6:
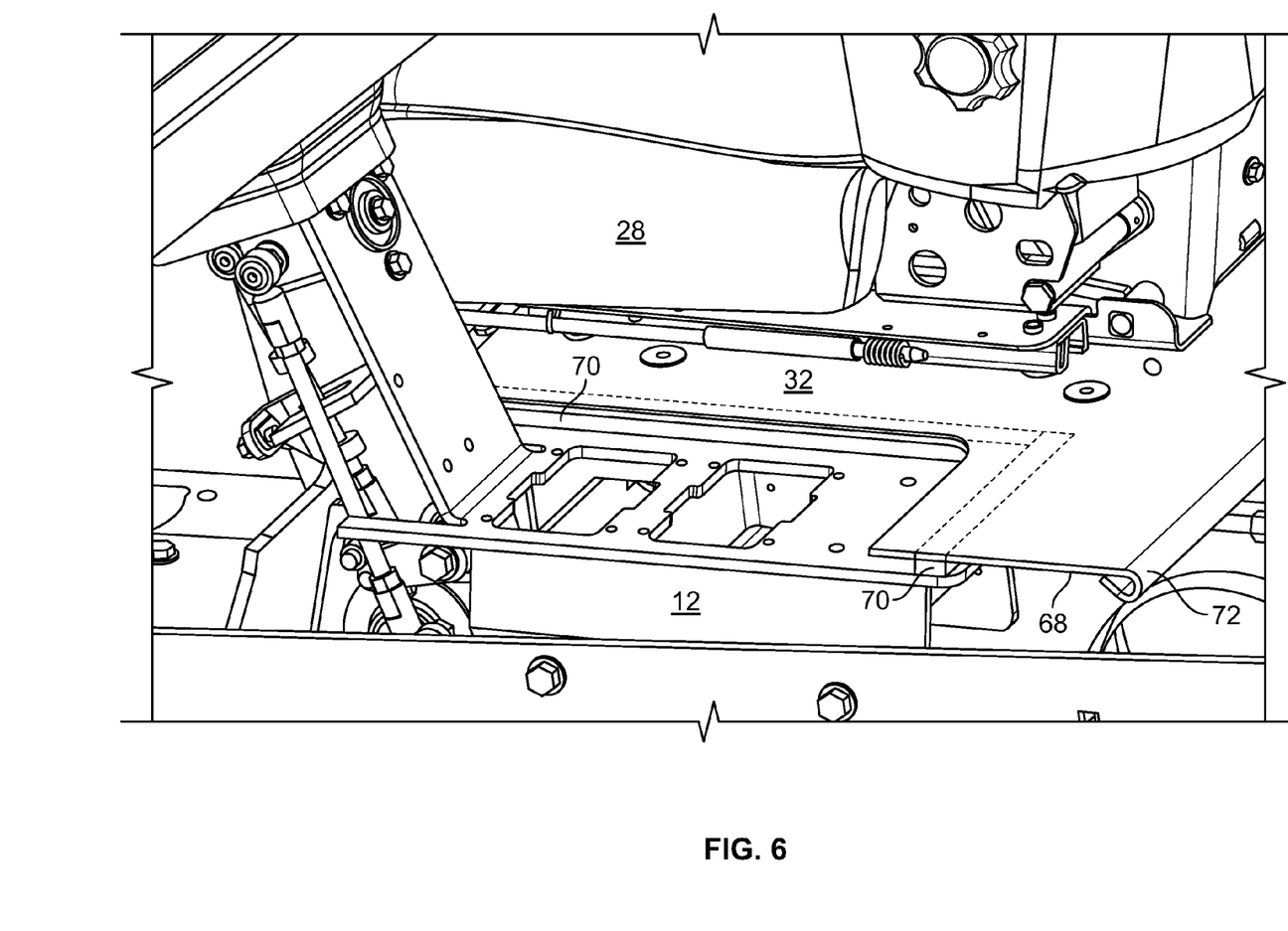

As shown in FIGS. 4-6, lower portion 40 of panel 34 of cab structure 20 includes a pair of flaps 64 (only one flap 64 shown in FIGS. 4-5). When cab structure 20 is disposed in the closed or operating position so that frame 12 abuts the cab structure 20, each flap 64 overlies and abuts a corresponding tab 68 (only one tab 68 shown in FIGS. 4-6) extending from base 32 of seat 28. FIG. 6 shows base 32 of seat 28 and one tab 68, with flap 64 (FIG. 5) of the cab structure 20 pivoted out of the way. As shown, tab 68 terminates in a reinforced region 72 in which a portion of tab 68 is folded over onto itself, providing enhanced structural stiffness and strength for tab 68. In the closed or operating position, flap 64 substantially prevents pivotable movement of seat 28 with respect to frame 12. This is achieved by virtue of the abutting contact between flaps 64 overlying corresponding tabs 68, especially with fasteners 60 (FIG. 3) secured to frame 12, which secured fasteners 60 likewise fixedly securing flaps 64 with respect to frame 12. In alternate embodiments, in the closed or operating position, other components of the cab structure 20 and seat 28 may alternately or additionally interact with each to substantially prevent pivotable movement between the cab structure 20 and seat 28. Such an arrangement provides enhanced operator comfort. For example, in the exemplary embodiment, tab 68 of base 32 of seat 28 becomes substantially immobile when disposed between frame 12 and flap 64 of panel 34 of cab structure 20 in the operating position, since there is substantially no relative movement between seat 28 and cab structure 20. Thus, neither base 32 nor seat 28 pivots with respect to restraining device 48 that is pivotably mounted to upper portion 36 of panel 34 of cab structure 20.

Figure 7:
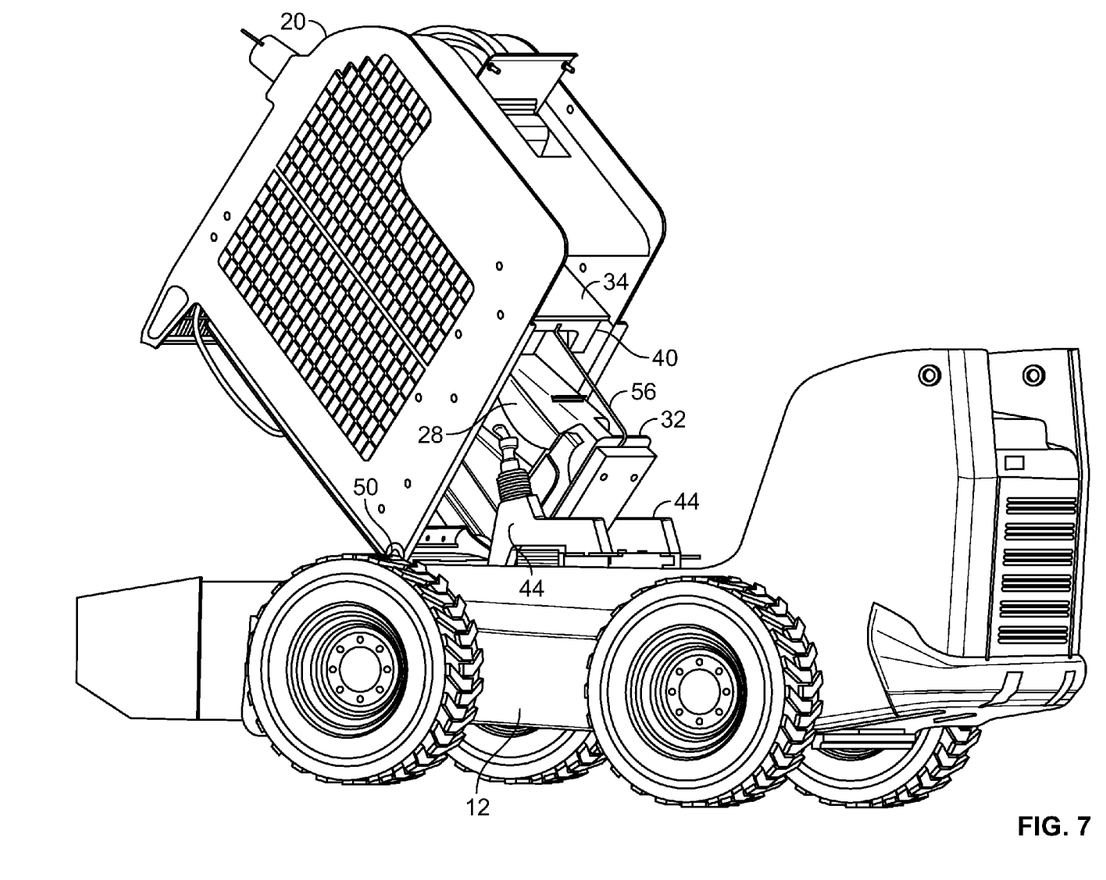
FIG. 7 is a bottom perspective rear view of an embodiment of a work vehicle, lifting structure removed and cab structure disposed in an open position, of the present invention.

In another embodiment as shown in FIG. 7, an interconnecting member 56 interconnects lower portion 40 of panel 34 of cab structure 20 to base 32 of seat 28. That is, interconnecting member 56 provides a flexible interconnection between cab structure 20 and seat 28. Interconnecting member 56 may be a strap, such as a cable or other suitable flexible construction. However, in an alternate embodiment, interconnecting member 56 may also be a rigid member and/or interconnect other portions of cab structure 20 to seat 28. Cab structure 20 is pivoted away from frame 12 in the closed position, which is shown in FIGS. 1 and 3, in which base 32 of seat 28 abuts frame 12, toward the open position as shown in FIGS. 2 and 4. Interconnecting member 56 is sized so that once cab structure 20 pivots a predetermined amount away from frame 12 in the closed position, seat 28 is urged to pivot away from frame 12. In one embodiment, the predetermined amount represents a rotation of cab structure 20 of from about 20 degrees to about 30 degrees away from frame 12. In response to the further rotation of cab structure 20 in the exemplary embodiment, seat 28 rotates from about 30 degrees to about 35 degrees away from frame 12. However, this exemplary rotational range is not intended to be limiting, as in alternate embodiments, the absolute and/or relative pivoting magnitudes of both cab structure 20 and seat 28 with respect to each other and also with respect to the frame 12 may vary as required to permit sufficient access to apparatus beneath seat 28, as well as permit removal of seat 28 from work vehicle 10.

In the exemplary embodiment, both cab structure 20 and seat 28 pivot or rotate toward end 24. However, one having ordinary skill in the art can appreciate that cab structure 20 and/or seat 28 may be configured to pivot or rotate in other directions. That is, in alternate embodiments, cab structure 20 and/or seat 28 may be configured to pivot or rotate in directions other than end 24, the end opposite end 24, or sides 26, 27. In addition, interconnecting member 56 may be secured to other portions of cab structure 20 other than panel 34, so long as seat 28 is urged away from frame 12.

FIG. 5 shows a junction 74 between frame 12, seat 28 and cab structure 20. More specifically, FIG. 4 shows a resilient material 66, such as a bulb seal, disposed between base 32, including tab 68, and lower portion 40 of panel 34, including flap 64. Resilient material 66 may be applied along the periphery of panel 34, as in the exemplary embodiment, or along or in close proximity to the periphery of base 32 or corresponding portions of frame 12 in other embodiments. In addition, a layer of resilient material 70 may be applied along junction 74 between frame 12 and base 32, including flap 64. It is appreciated that resilient material 66, 70 may be applied along other respective junctions between frame 12, seat 28 and cab structure 20. In one embodiment, the junctions between corresponding portions of frame 12, seat 28 and cab structure 20 form a substantially particle tight seal, and in another embodiment, the junctions form a substantially fluid tight seal.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A work vehicle comprising:
   a frame; and
   a cab structure and a seat each pivotably connected to the frame;
   wherein in response to the cab structure and seat being disposed in an operating position with the frame, the cab structure substantially prevents pivotable movement of the seat;
   wherein a lower portion of the cab structure overlies the base of the seat; and
   wherein a junction between the cab structure, seat and frame forms a substantially partical tight seal.

2. The work vehicle of claim 1, wherein a junction between the cab structure, seat and frame forms a substantially fluid tight seal.

3. The work vehicle of claim 1, wherein at least a portion of a junction between the cab structure, seat and frame includes a bulb seal.

4. The work vehicle of claim 1, wherein the seat and cab structure each pivot toward a same end of the frame.

5. The work vehicle of claim 4, wherein the same end of the frame is a front end.

6. The work vehicle of claim 1, wherein the cab structure and seat are mechanically interconnected to each other.

7. The work vehicle of claim 6, wherein the mechanical interconnection between the cab structure and seat is a flexible interconnection.

* * * * *